United States Patent [19]

Storke et al.

[11] Patent Number: 4,486,036
[45] Date of Patent: Dec. 4, 1984

[54] REUSABLE COUPLING

[76] Inventors: Francis J. Storke, P.O. Box 424, Annapolis, Md. 21204; Carl L. Grayson, 2012 Norman Rd., Glen Burnie, Md. 21061; Ernest B. Loker, 110 Tarragon La., Edgewater, Md. 21037

[21] Appl. No.: 428,053

[22] Filed: Sep. 29, 1982

[51] Int. Cl.³ .................. F16L 33/00; F16L 21/06
[52] U.S. Cl. ..................... 285/253; 285/242; 285/245; 285/321; 285/347
[58] Field of Search ............... 285/252, 253, 242, 243, 285/245, 347, 321, DIG. 16

[56] References Cited

U.S. PATENT DOCUMENTS

| | | |
|---|---|---|
| 237,324 | 2/1881 | Reynolds . |
| 1,004,634 | 10/1911 | Dixon . |
| 1,382,840 | 6/1921 | Levedahl . |
| 2,358,575 | 10/1943 | Hurley . |
| 2,819,916 | 1/1958 | Seifert ............................... 285/244 |
| 3,375,025 | 3/1968 | Engel . |
| 3,432,187 | 3/1969 | Mooney et al. . |
| 3,472,536 | 10/1969 | Ingram ............................. 285/253 |
| 3,687,491 | 8/1972 | Marshall . |

FOREIGN PATENT DOCUMENTS 212881 4/1957 Australia ............................. 285/253

Primary Examiner—Richard J. Scanlan, Jr.

[57] ABSTRACT

A coupling and method of coupling thin-wall hose/tubing and the like includes an inner member, a sleeve surrounding the inner member and the tubing therebetween. The inner member is provided with a pair of tubing grooves and a seal material between the grooves. By means of compression rings or annular ridges the tubing is forced into the tubing grooves and stretched across the seal, thus forming a fluid-tight coupling member.

10 Claims, 3 Drawing Figures

REUSABLE COUPLING

BACKGROUND OF THE INVENTION

1. Field of the Invention

This invention relates to a reusable coupling, and more particularly to a coupling for use with thin-walled flexible hose or tubing.

2. Prior Art

It is a common practice to utilize hose clamps and the like for coupling and securing relatively thick-walled rubber hoses and the like. The hose clamp can be tightened into the rubber hose wherein, by means of sufficient pressure, the hose clamp will exert sufficient force on the hose, deforming same, to create a tight seal between the hose and the article to which it is clamped. Essentially, it is the inner resilience of the hose against the nipple to which it is pressed which performs the sealing.

However, with the advent of very thin hose or tubing with a wall thickness of about 0.125 inch having, for example, a woven polyester and nylon carcass with a urethane coating (of the type sold commercially by Angus Fire Armour, Inc., under the name "CHEMI-COIL"), it is impossible to successfully utilize conventional hose clamps. The terms "hose" and "tubing" used throughout the application are interchangeable and designate thin-walled flexible articles primarily of non-metallic material. What has been done in the past is to place a large number of hose clamps adjacent each other on the tubing. By sheer numbers and forces, it has been possible to secure the hose. While such procedure may be acceptable for irrigation water and the like, it is not acceptable for use with fluids which can contaminate the environment.

OBJECTS AND SUMMARY OF THE INVENTION

It is an object of the instant invention to provide a coupling which produces a good seal between the tubing and the article to which it is attached.

Another object is to provide reusable couplings which can be recoupled in the field and can be assembled with no special tools.

Still another object is to provide a coupling which can withstand relatively high pressures compared to its size.

A further object is to provide means for coupling lengths of thin-walled hose/tubing together which can withstand relatively high pressures with extreme longitudinal pull, such as encountered in conveying such diverse fluids as drinking water, fuel, oil or the like from off-shore vessels to installations or facilities on-shore without leakage and/or contamination of the environment.

Another object is to provide a nipple, by venture of an elastomeric coating seal being coated or applied to the nipple, is the sealing agent between the nipple and the hose.

A coupling and method of coupling thin-wall hose/tubing and the like includes an inner member, a sleeve surrounding the inner member and the tubing therebetween. The inner member is provided with a pair of tubing grooves and a seal material between the grooves. By means of compression rings or annular ridges the tubing is forced into the tubing grooves and stretched across the seal, thus forming a fluid-tight coupling member.

BRIEF DESCRIPTION OF THE DRAWINGS

The above and other objects and advantages of the invention will be appreciated from the following description and accompanying drawings, wherein.

DETAILED DESCRIPTION OF THE INVENTION

FIG. 1

Figure 1:
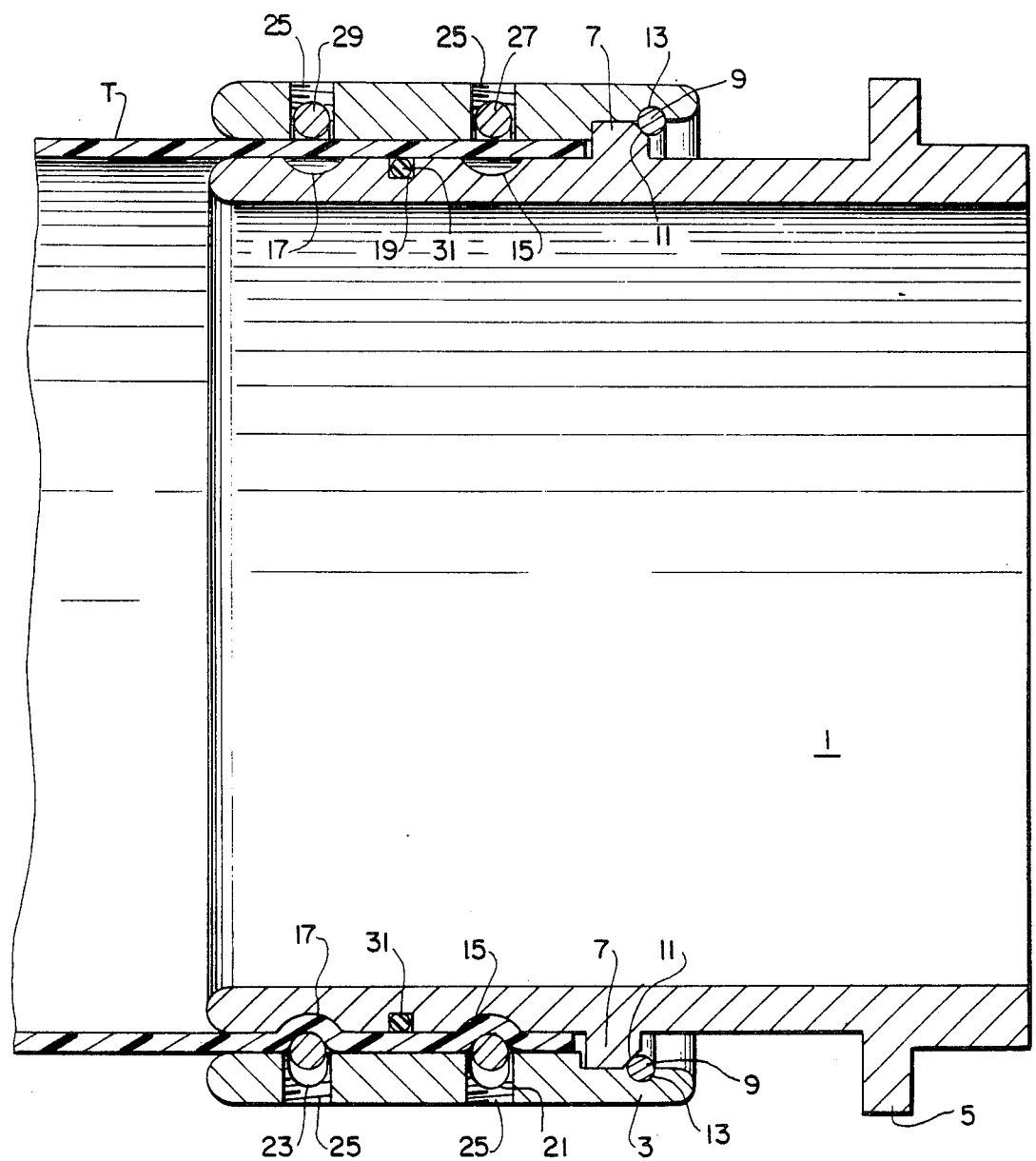
FIG. 1 is a side elevation view in cross-section of a first embodiment of the invention (the top portion of the FIGURE shows the coupling partially assembled, and the lower portion shows the coupling completely assembled)

Referring to FIG. 1 a coupling is seen having a male nipple portion 1 and a sleeve 3. Obviously, member 1 could be the female portion of the coupling. The nipple is essentially of standard design having a first outer flange 5 and a second retainer flange 7. The retainer flange 7 cooperates with a metal retainer ring 9 which in turn cooperates with a beveled edge 11 on flange 7 and an annular groove 13.

The nipple 1 also has an inner annular hose/tubing groove 15 and an outer annular hose/tubing groove 17, together with an annular seal groove 19 between grooves 15 and 17.

The sleeve 3 includes an inner compression ring groove 21 concentric with groove 15 and an outer compression ring groove 23 concentric with groove 17. Located around the periphery of the sleeve 3 in the embodiment of FIG. 1 are a plurality of threaded openings 25 to receive jacking screws (not shown). Positioned in grooves 21 and 23 are a pair of compression rings in the form of an inner compression ring 27 and an outer compression ring 29.

Positioned in groove 19 is a seal member which in the embodiment of FIG. 1 is seen as an O-ring 31. A thin-walled tubing T is inserted between nipple 1 and sleeve 3 in a manner described below.

In place of the jacking screws, other types of pressure means can be utilized, such as a tapered wedge action, i.e., whereby a tapered sleeve and wedge can force the compression rings and associated tubing into annular recesses 15 and 17.

OPERATION (FIG. 1)

The compression rings 27 and 29 are inserted in annular grooves 21 and 23, respectively, in sleeve 3. The compression rings are substantially annular with a slight opening. (In the case of a six inch diameter coupling there would be an approximate opening of ⅛ of an inch or less when the compression rings are in place.) The sleeve 3 is then slid over the tubing T, and nipple 1 is inserted into tubing T as seen in the top portion of FIG. 1. Retainer ring 9 is then installed. The jack screws are inserted in threaded openings 25 and screwed down so that the coupling assumes the position seen in the lower portion of FIG. 1. This in turn will put pressure on the tubing to create the annular indentation as seen in the lower portion of FIG. 2.

The sleeve 3 will also exert pressure on the outside of the tubing T between the compression rings and, cooperating with O-ring seal 31, will create a seal between the tubing and the coupling. The location of seal 31 between grooves 15 and 17 permits the tubing to be stretched over the O-ring seal 31.

While the wall thickness of the tubing is normally made with close tolerances, the diameter may vary slightly. Thus, with the arrangement of the seal 31, slight deviations in the diameter of the tubing can be accommodated since the seal 31 will fill any leak paths. Also, because of the pressures on the tubing and the coupling, if the seal slightly comes out of recess 19, it will fill the void created by the slightly larger tubing.

It will be appreciated that while threaded openings 25 and jacking screws have been disclosed in the instant modification, other types of pressure means on compression rings or the like can be utilized.

FIGS. 2 AND 3

Figure 2:
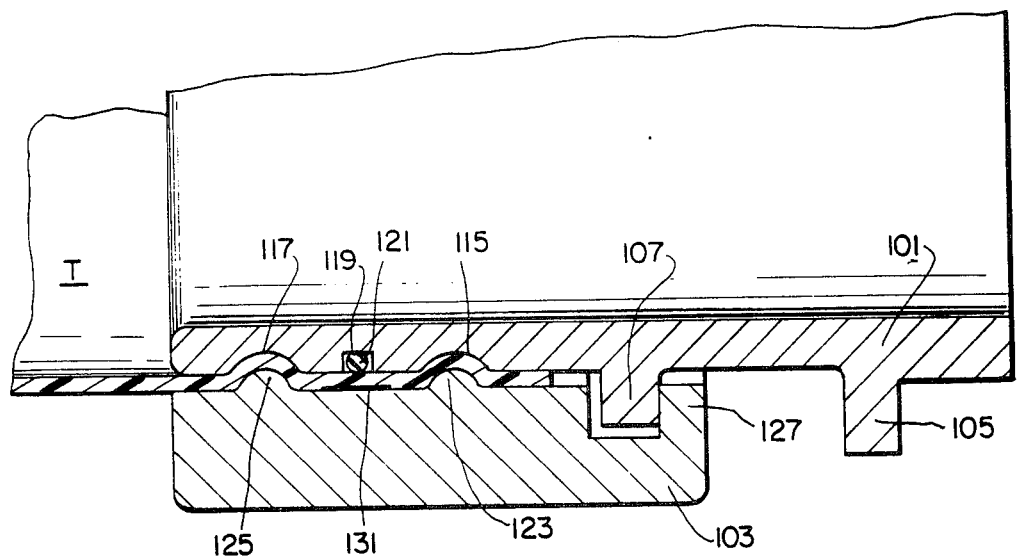
FIG. 2 is a side elevation view in cross-section of a second embodiment of the invention.
Figure 3:
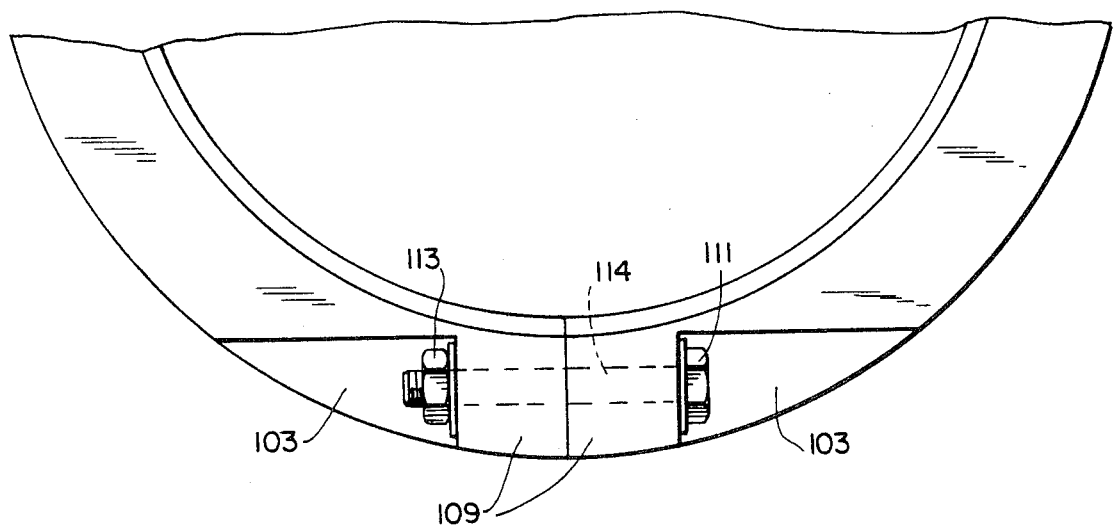
FIG. 3 is an end elevation view of a portion of the embodiment shown in FIG. 2.

Referring now to FIGS. 2 and 3, a male nipple 101 similar to that described in FIG. 1 is illustrated with a sleeve 103 surrounding it. The nipple 101 has an outer flange 105 and an inner flange 107. The sleeve 103 is formed preferably in three parts which are joined together as seen in FIG. 3 by means of a pair of brackets 109 with a bolt 111 and nut 113, the bolt extending through a pair of complementary openings 114 in brackets 109 in the conventional manner.

Nipple 101 has a pair of annular tubing grooves 115 and 117, as well as an intermediate seal groove 119, comparable to grooves 15, 17 and 19 in FIG. 1. A seal 121 with a round, square, cup-shaped, rectangular or cross-section similar to O-ring 31 in FIG. 1, may be inserted in groove 19. In place of the compression rings and jacking screws of FIG. 1, the embodiment of FIG. 2 employs a pair of annular ridges 123 and 125 cooperating with grooves 115 and 117, respectively. An end flange 127 cooperates with inner flange 107 to locate the sleeve so that elements 123 and 125 align with grooves 115 and 117, respectively. A continuous metal band 131 may be placed opposite the groove 119 to cooperate with seal 121.

OPERATION (FIGS. 2 AND 3)

The nipple 101 is slid into the tubing T, and the three segments 103 are placed in the position shown in FIG. 2. The bolts 111 are inserted through openings 114 and nuts 113 are tightened so that annular ridges 123 and 125 push the tubing into annular grooves 115 and 117, respectively. The tubing is stretched over the seal 121, and the pressure exerted by metal band 131 on the sealing material 121 creates the seal in the same manner as discussed in FIG. 1.

It will be appreciated that in both of the embodiments discussed above the use of the resilient material 31 and 121 in the respective embodiments in conjunction with the flexible thin-walled tubing T creates the seal arrangement. This is in contradistinction to the prior art which relies on hose clamps or other gripping means to grip the hose to perform the seal.

OTHER MODIFICATIONS

In place of the seal and seal groove discussed above, another modification could involve stretching a thin, resilient, tubular member, made of a polymer such as rubber, polyurethane or the like between the tubing T and the nipple 1 or 101. Alternatively, a thin layer of resilient material could be sprayed or otherwise coated thereon. Obviously, the resilient material would best be placed between the tubing grooves, but could also cover substantially the entire nipple.

Also, the outer member may be in the form of a conventional hose clamp, a band, or can be wraps of wire wound substantially in a spiral manner around the hose/tubing.

While several embodiments of the invention have been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A coupling for use with flexible hose, tubing and the like comprising:
   (a) an inner member,
   (b) an outer member substantially surrounding said inner member,
   (c) means for receiving and retaining tubing therebetween, said receiving and retaining means comprising:
      (1) a pair of substantially annular tubing grooves on the periphery of said inner member,
      (2) a seal receiving groove adjacent at least one of said tubing grooves, and sealing material in said seal receiving groove,
      (3) a first substantially annular means cooperating with the tubing and said tubing grooves for forcing said tubing into said grooves,
      (4) a second substantially annular means opposite said seal receiving groove cooperating with said tubing and said sealing material for exerting a force on said sealing material.

2. A coupling as defined in claim 1 wherein said outer member is in the form of a plurality of interconnected segments.

3. A coupling as defined in claim 1 wherein said first substantially annular means are a pair of substantially annular ridges.

4. A coupling as defined in claim 1 wherein said seal receiving groove is positioned between said pair of tubing grooves.

5. A coupling for use with flexible hose, tubing and the like comprising:
   (a) an inner member,
   (b) an outer member substantially surrounding said inner member,
   (c) means for receiving and retaining tubing therebetween, said receiving and retaining means comprising:
      (1) a pair of annular tubing grooves on the periphery of said inner member;
      (2) a seal receiving groove between said tubing grooves, sealing material in said seal receiving groove, and an annular band between said outer member and the tubing opposite said seal receiving groove; and
      (3) substantially annular means cooperating with the tubing and said tubing groove for forcing the tubing into said groove.

6. A coupling as defined in claim 5 including a substantially annular ridge cooperating with said tubing and said tubing groove.

7. A coupling as defined in claim 5 wherein said sealing material surrounds a substantial portion of said inner member.

8. A coupling as defined in claim 5, wherein said outer member is in the form of a plurality of interconnected segments.

9. A coupling as defined in claim 5, wherein said substantially annular means are a pair of substantially annular ridges.

10. A method of sealing thin-walled flexible hose, tubing and the like comprising:

(a) providing a first inner coupling member and a second outer coupling member surrounding said first member,
(b) forming a pair of tubing receiving grooves in said inner member,
(c) forming a seal receiving groove in said inner member between said sealing grooves,
(d) inserting sealing material in said seal receiving groove,
(e) placing tubing over said first member,
(f) placing an annular metal band over said tubing substantially concentric with said sealing material,
(g) forcing the tubing into said tubing grooves and tightly over said seal material, and stretching the tubing over the sealing material as the tubing is forced into said tubing grooves to form a tight seal between said sealing material and the tubing.

* * * * *

UNITED STATES PATENT AND TRADEMARK OFFICE
CERTIFICATE OF CORRECTION

PATENT NO. : 4,486,036

DATED : December 4, 1984

INVENTOR(S) : Francis J. STORKE et al

It is certified that error appears in the above-identified patent and that said Letters Patent is hereby corrected as shown below:

On the title page add:

[73] Assignee: Hydrasearch Co. Inc., Annapolis, Md.

Signed and Sealed this

Thirty-first Day of December 1985

[SEAL]

Attest:

DONALD J. QUIGG

Attesting Officer

Commissioner of Patents and Trademarks